UNITED STATES PATENT OFFICE.

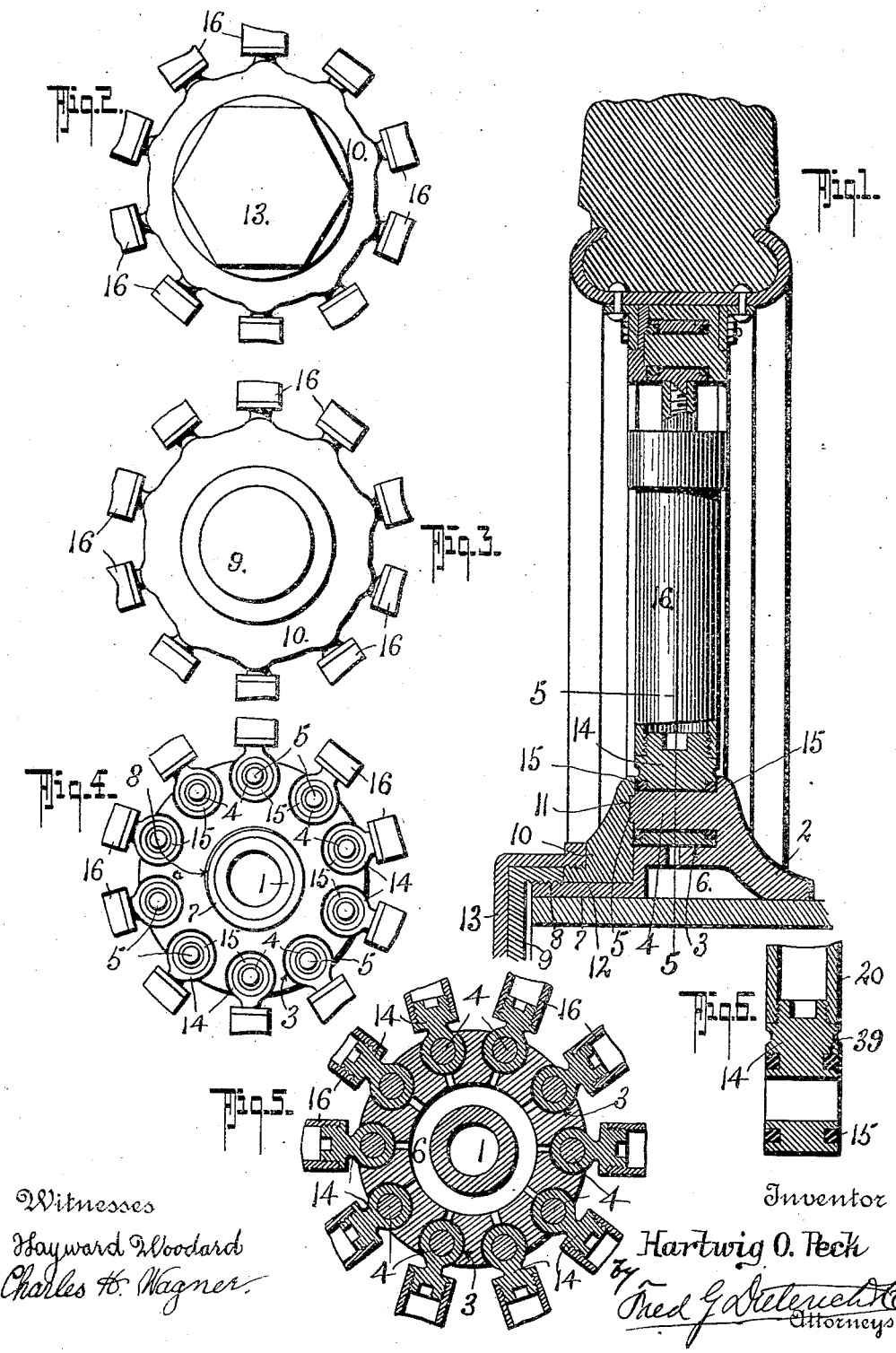

HARTWIG O. PECK, OF PORTLAND, OREGON, ASSIGNOR TO H. O. PECK AUTOMOBILE WHEEL COMPANY, INCORPORATED, OF PORTLAND, OREGON.

VEHICLE-WHEEL.

943,564. Specification of Letters Patent. Patented Dec. 14, 1909.

Original application filed May 13, 1909, Serial No. 495,582. Divided and this application filed October 22, 1909. Serial No. 524,088.

*To all whom it may concern:*

Be it known that I, HARTWIG O. PECK, residing at Portland, in the county of Multnomah and State of Oregon, have invented certain new and useful Improvements in Vehicle-Wheels, of which the following is a specification.

My invention is an improved vehicle wheel of the resilient spoke type and in its generic nature the present invention has for its object to provide a wheel of this type wherein the connections between the spokes and the hub will be as nearly dust-proof as possible, and in which the parts are so constructed and designed as to effect a maximum strength of parts with the least possible weight.

More specifically the present invention comprises an improved hub formed of a member having a series of pockets to receive the pivot heads of the spokes, such member having integral pivot pins disposed centrally in such pockets and having projecting ends to enter recesses on a flange that is secured on the hub to close the pockets and steady the pins. The pivot heads of the spokes may be provided with felt rings or washers to keep dust out of the bearing as well as to absorb oil and maintain the desired lubrication of the parts.

The present application is a divisional part of my copending application filed May 13, 1909, Serial No. 495,582.

The invention also resides in those novel details of construction, combination and arrangement of parts, all of which will be first described and then be specifically pointed out in the appended claims, reference being had to the accompanying drawings, in which:

Figure 1, is a central vertical transverse section of a vehicle wheel embodying my invention, a part only of the hub being shown. Fig. 2, is a side elevation of the hub, the spokes being broken away. Fig. 3, is a similar view the lock nut cap being removed. Fig. 4, is a similar view the lock nut, the flange nut and the hub flange disk being removed. Fig. 5, is a section on the line 5—5 of Fig. 1. Fig. 6, is a detail view of a modified manner of holding the felt washer rings in the spokes.

Referring now to the accompanying drawings in which like numerals of reference indicate like parts in all of the figures, the axle 1 receives the hub 2 which is provided with a series of circular pockets 3 to receive the heads 14 of the spokes 16. Within each pocket and integrally formed with the hub is a pin 4 that projects through the pivot apertures of the spoke head 14 and has a projecting end 5 for a purpose presently understood. The hub 2 may be provided with an internal annular pocket 6 between it and the axle that may be used to contain grease to lubricate the bearings of the spoke heads on the pins 4 by providing small capillary passages between the pocket 6 and the pockets 3, as shown in Fig. 1, of the drawings.

The hub 2 has a forwardly projecting sleeve 7 that is threaded on its end, as at 8, to receive the nut cap 9, that abuts the threaded portion 12 in the flange cap 10, which forms a closure for the pockets 3 and which is depressed at 11 to receive the projecting ends 5 of the pins 4.

A dust cap and lock nut member 13 is threaded onto the threaded portion 12 of the flange plate or cap 10 and serves as a lock nut for the nut cap 9. The spoke heads 14 have countersunk portions to receive felt washer rings 15 that serve to prevent dust entering the pockets 3. Instead of countersinking the pin aperture of the heads 14 to receive the felt rings 15, such heads 14 may be grooved as at 39 in Fig. 6 to receive the felt rings 15.

The spokes 16 may be of any approved construction, preferably that disclosed in my original application hereinbefore referred to.

From the foregoing it will be noticed that by constructing the hub and connecting it with the spokes as hereinbefore described, a practically dust-proof bearing is provided for the spoke head, and at the same time a very efficient connection between the spokes and hub is provided.

From the foregoing description taken in connection with the accompanying drawings, it is thought the complete construction, operation and numerous advantages of my invention will be readily understood by those skilled in the art to which the invention appertains.

What I claim is:

1. In a vehicle wheel, a hub having a series of pockets, and pins integrally formed with said hub projected centrally through said pockets, spokes having pivot heads held in said pockets and apertured to permit passage of said pins, said hub having a threaded projection, a hub cap mounted thereon to close said pockets and having depressions to receive the projecting ends of said pins, a nut cap threaded on said threaded projection to retain said hub cap in position, and means for locking said nut to said threaded projection of said hub.

2. In a vehicle wheel a hub having a series of pockets and pins integrally formed with said hub projected centrally through said pockets, spokes having pivot heads held in said pockets and apertured to permit passage of said pins, said hub having a threaded projection, a hub flange mounted thereon to close said pockets and having depressions to receive the projecting ends of said pins, a nut cap threaded on said threaded projection to retain said hub flange in position, means for locking said nut to said threaded projection of said hub, said hub having an internal chamber, and having capillary apertures to afford communication between said pockets and said chamber.

HARTWIG O. PECK.

Witnesses:
A. C. EMMONS,
I. S. ARMSTRONG.